July 10, 1962 D. W. BYERS 3,043,363
MACHINE FOR AUTOMATICALLY PLACING AND SECURING FILM
TRANSPARENCIES IN FILM MOUNTS
Filed March 14, 1961 5 Sheets-Sheet 1

*INVENTOR.*
DONALD W. BYERS

BY

ATTORNEY

INVENTOR.
DONALD W. BYERS
BY
ATTORNEY

*INVENTOR.*
DONALD W. BYERS
BY
ATTORNEY

United States Patent Office 3,043,363
Patented July 10, 1962

---

3,043,363
MACHINE FOR AUTOMATICALLY PLACING AND SECURING FILM TRANSPARENCIES IN FILM MOUNTS
Donald W. Byers, 4033 SE. Milwaukee Ave., Portland 2, Oreg.
Filed Mar. 14, 1961, Ser. No. 95,579
14 Claims. (Cl. 156—443)

This invention relates in general to means for mounting film transparencies in the customary film mounts. As is well-known, such a film mount consists of a pair of frames of cardboard or similar suitable material, hinged together along one edge, and adapted to be folded together on the hinged edge with the transparency placed between them and in place in their registering windows. The inner faces of the pair of frames are provided with a heat-softenable or thermoplastic adhesive so that when the frames are brought together over the interposed transparency, the application of heat and pressure will cause the two frames to be secured together with the transparency in place.

The mounting of a film transparency includes the various steps of taking an open film mount from a source of supply, moving it into position for receiving the transparency, severing the transparency from the film strip, setting the severed transparency in place on one of the frames of the open mount, folding the other frame over the first mentioned frame and interposed transparency, and heat-pressing the two frames together with the transparency in place between them. A subsequent step of dating or otherwise marking the completed mount is also generally included as an optional part of the transparency mounting operation.

The object of the present invention is to provide an improved and practical machine into which these steps will be performed automatically.

A further object of the invention is to provide such a machine in which the mounting of a supply or strip of film transparencies will take place automatically in rapid succession with only a minimum amount of labor and skill being required on the part of the operator.

The manner in which these objects and other features and advantages, constituting further specific objects of the invention, are attained with the machine of the present invention, and the construction and manner of operation of the machine, will be explained in the following brief description with reference to the accompanying drawings.

Figures 1, 2, 3B, 9:
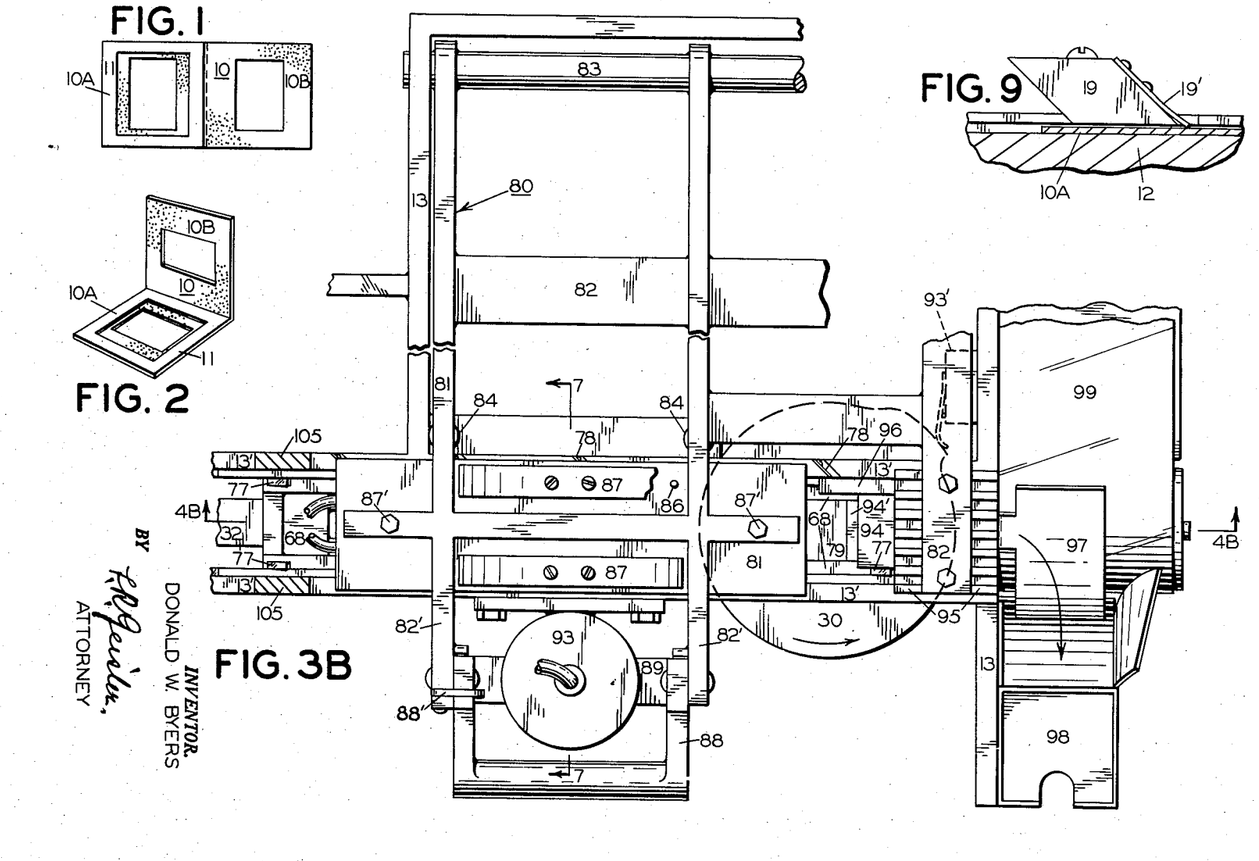
FIG. 1 is a plan view of a conventional mount of the type above indicated.
FIG. 2 is a perspective view showing the same mount in the process of being folded over on itself in order that the two frames may be sealed together, the film transparency, which would have been placed in the bottom frame, being omitted in the drawing.
FIGS. 3A and 3B together constitute a plan view of the machine, with certain parts broken away for clarity and with the container or dispenser for the mounts shown in section in FIG. 3A.
FIG. 9 is a fragmentary section on line 9—9 of FIG. 3A drawn to a larger scale.
Figures 4A, 4B:
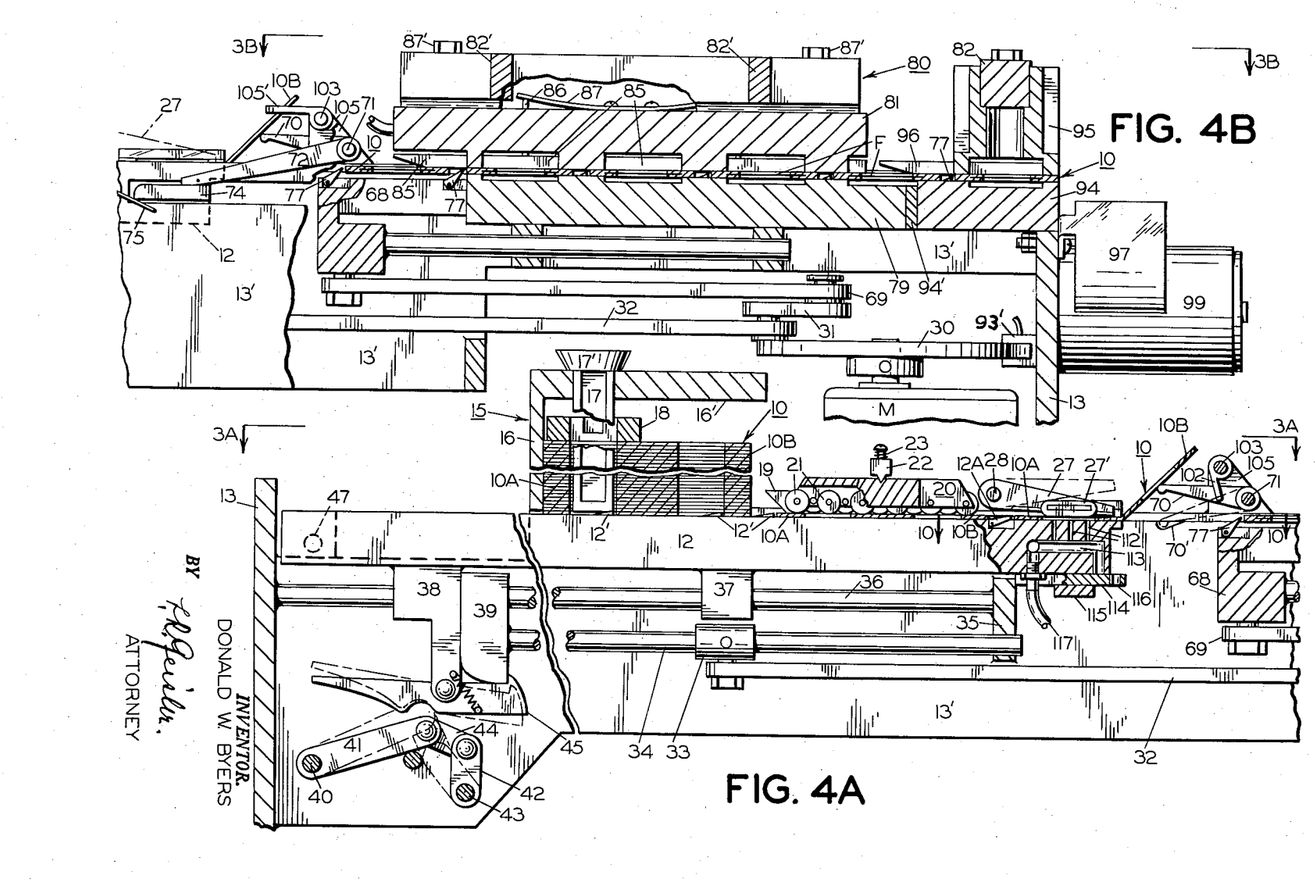
FIGS. 4A and 4B together similarly constitute a front sectional elevation of the machine, with some parts broken away for clarity and some shown in sectional elevation, FIG. 4A being a sectional elevation on line 4A—4A of FIG. 3A, and FIG. 4B being a sectional elevation on line 4B—4B of FIG. 3B.

In FIGS. 1, 2 and 4A the mounts for the transparencies are indicated in general by the reference character 10, the two hinged frames of which each mount is comprised being designated 10A and 10B, the two frames having windows of nearly the same size which are in exact registration when one frame is folded over on the other. One of the frames, for example the frame 10A, as shown in FIGS. 1 and 2, has a border 11 of an extra material so as to provide a recess within the border for the transparency. The opposed faces of the two frames are coated with a heat-softenable adhesive and the sealing of the mount with the transparency therein is done by application of heat and pressure. This is well-known and old in the art.

A carriage 12 (FIGS. 3A and 4A) is slidably mounted in a portion of a main frame 13 of the machine, and the top of the carriage moves between a pair of parallel vertical side walls 13'. The tops of these walls are recessed along the inside edges to provide a pair of guide tracks for the mounts 10. The top face of the carriage 12 is in approximately the same horizontal plane as the guide tracks or recesses in the tops of the side walls 13'. When the carriage 12 is operated it reciprocates in a short horizontal path, moving from left to right (as viewed in FIG. 4A) and back again, as later described. The machine includes a second carriage, later explained, which is in alignment with the carriage 12 and the recessed tops of the side walls 13' continue along the path of the second carriage.

The carriage 12 has regularly spaced, low, tapered lugs 12' along the center of its top surface. These lugs terminate in vertical shoulders at their right ends, the height of the shoulders being almost equal to the thickness of the mounts. The spacing of these lugs corresponds to the spacing of the pair of windows in each mount. Thus, as apparent, a pair of these lugs, by engaging the pair of windows of a mount, will move the mount from left to right as the carriage moves in that direction, allowing the lugs to slide back under the mount upon the return movement of the carriage provided the mount is held against movement to the left. The carriage 12 also has a pair of spring-actuated lugs 12A (FIGS. 3A, 4A and 10) for engaging the mount at the time it has been moved far enough on the carriage 12 for receiving the transparency, as later described. Flat springs 19' (FIGS. 3A and 9), secured on guides 19, mounted on the side walls 13', bear down on the mounts on the carriage and keep the mounts from moving back to the left with the return of the carriage to the left. Additional flat springs 14 (FIG. 10) in turn hold the mount against return movement with the carriage.

A hold-down assembly 20 (FIGS. 3A and 4A), hingedly mounted at 20' on the top of one of the side walls 13', is provided with a plurality of rollers 21 adapted to bear down on the mounts passing beneath this assembly and to hold them down flat on the top of the face of the carriage. An arm 22 is pivotally mounted on the opposite side wall so as to bear down on the top of the assembly 20 but to permit the assembly to be raised up from the carriage 12 on its hinge 20' when the arm 22 is swung to one side. The arm 22 in turn is held down by a pressure spring 23 so as to allow some resiliency in the pressure exerted on the passing mounts by the assembly 20.

A mount container and dispenser 15 (FIGS. 3A and 4A) is secured on the top of the sides 13' of the main frame 13 above the carriage 12 in the position indicated in FIGS.

Figure 3A:
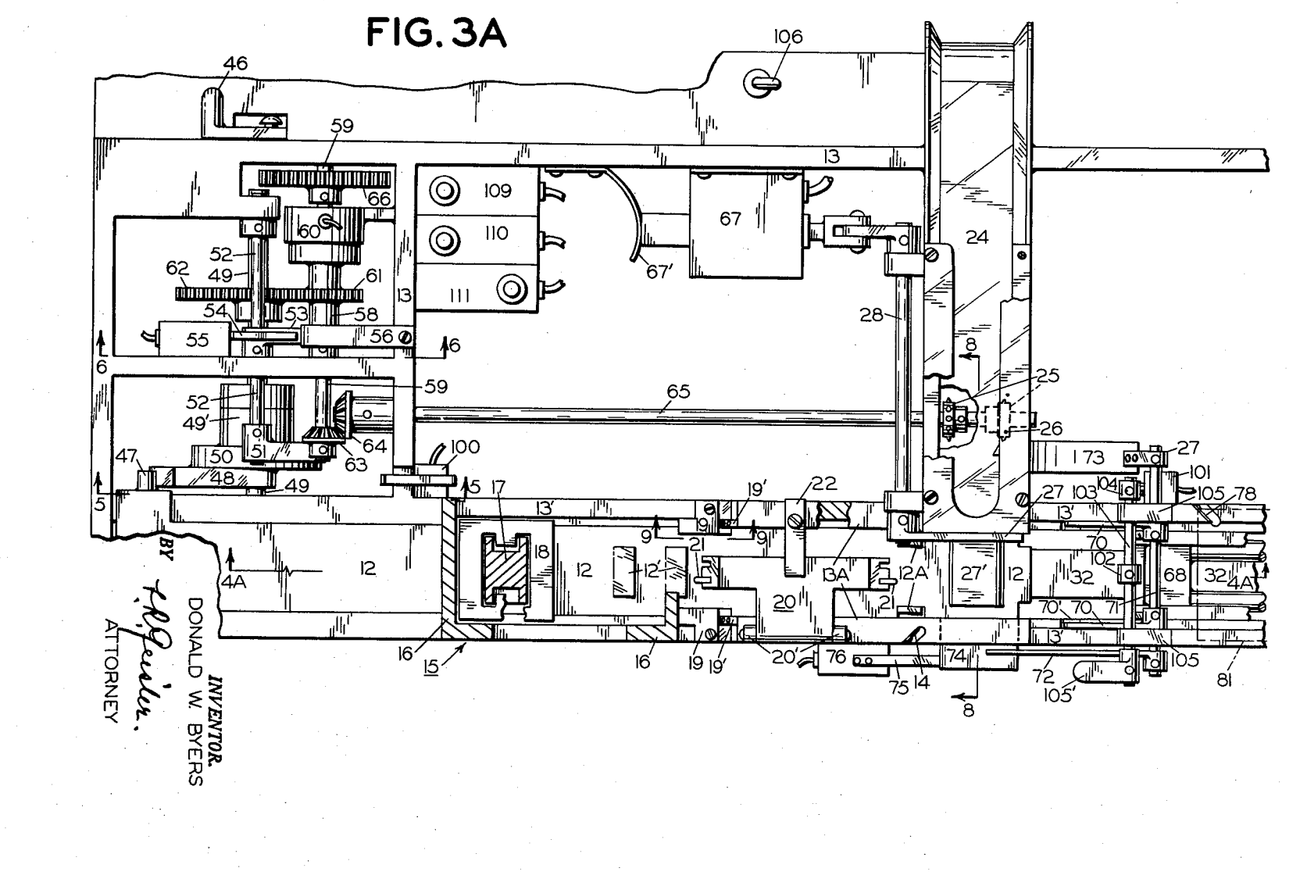

3A and 4A. This container comprises an incomplete housing consisting of spaced upright housing sections 16 connected with a top wall and having a top extension 16' in which a mount holding guide 17 is slidably held. The mount holding guide 17 is H-shape in cross section, as shown in FIG. 3A and is of such size to have a loose sliding fit through a window in a frame in each of the mounts stacked in the container 15. The mounts are arranged in the container as indicated in FIG. 4A, that is with the guide 17 extending down through the window in the frame 10A of each mount, except in the case of the bottom mount in the stack. The holding guide 17 has a head 17' which engages the top of the housing extension 16' of the container and prevents the bottom of the guide 17 from extending entirely down to the top of the carriage 12, the arrangement being such that the bottom of the holding guide 17 will be held spaced from the top of the carriage 12 a distance approximately equal to the thickness of the frame 10A of the bottom mount in the stack. This enables the bottom mount to be pulled out from beneath the stack by a pair of lugs 12' on the carriage 12 when the carriage 12 moves from left to right (as viewed in FIG. 4A), but prevents more than one mount from being pulled out from the stack at a time. When the carriage 12 moves back to the left in returning to starting position a pair of the lugs 12' pass under the next mount on the bottom of the stack and thus prepare for its removal from the bottom of the stack, and so on. A weight 18, slidably placed on the guide 17, presses down on the stack of the mounts so that the bottom mount will be held down firmly on the carriage 12 and thus will be positively engaged by the pair of lugs 12' on the carriage when such pair of lugs become positioned in the pair of windows of the bottom mount.

As each mount is moved out from the bottom of the stack in the container 15 it moves under the hold-down assembly 20, previously described. The mount is also engaged by a pair of inclined flat springs 19' previously mentioned, preventing the mount from moving back to the left (as viewed in FIG. 3A) and enabling the mount to be moved further to the right upon the next movement of the carriage 12 to the right. A third movement of the carriage 12 to the right brings the first mount in proper position on the guide tracks so that the frame 10A will be ready to receive the transparency which is delivered onto the mount frame in the manner now to be described.

Figure 8:
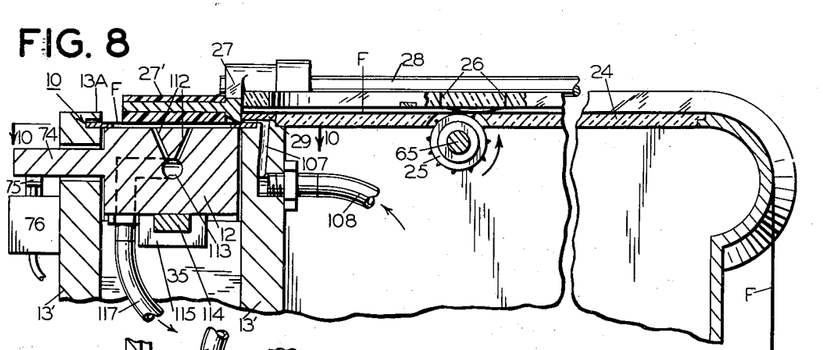
FIG. 8 is a fragmentary section on line 8—8 of FIG. 3A drawn to a larger scale.

A guideway 24 (FIGS. 3A and 8), extending forwardly on the main frame of the machine, and arranged at 90° with respect to the path of movement of the carriage 12, guides the strip of film F from which the transparencies are to be severed for the mounts. This guideway 24 is of proper width to accommodate the width of the film strip and is provided with suitable side guide rails to hold the film in place while the film is pulled along in the guideway. A pair of sprocket wheels 25 below the guideway on each side extend up through openings in the guideway so as to engage the usual perforations extending along each side of the film strip. Wire spring elements, one of which is shown at 26 in FIG. 8, are positioned above the sprocket wheels and hold the edges of the film strip down in engagement with the sprocket wheels as the film strip slides along under the spring members and is moved by the rotation of the sprocket wheels 25. The sprocket wheels 25 may be rotated manually (for positioning the film at the start of the mounting operation, or for other purposes) but, in the regular operation of the machine, are operated automatically and intermittently by the movement of the carriage 12, as subsequently explained.

A cutter blade 27, secured on the end of a rotatable shaft 28, for limited movement in a vertical plane, swings down automatically when the film has been advanced a sufficient distance to cause the end transparency on the moving film to be in proper position over the underlying frame 10A of a mount. Thereupon the cutter blade is automatically swung down and, in cooperation with an anvil 29, severs the positioned transparency from the end of the film strip. The cutter blade carries a padded pressing plate 27' (FIGS. 3A and 8) to hold the transparency down flat in the frame of the mount during the severing of the transparency from the film strip. The cutter blade is operated by a solenoid 67 (FIG. 3A) which causes the cutter blade momentarily to be swung down in opposition to the solenoid spring 67'.

A disc 30 (FIG. 4B), operated by a motor M, carries a rigidly secured, double off-set crank 31. A link 32, having one end pivotally mounted on the lower stub shaft on this member 31, has its other end (FIG. 4A) pivotally connected to a sleeve 33 clamped on a slide bar 34. The slide bar 34 slides in an end member 35 which is secured on the end of a stationary rod 36, one end of this stationary rod being secured to the main supporting frame 13 of the machine. The stationary rod 36 extends through a pair of slidable sleeve support members 37 and 38 which are rigidly secured to the bottom of the carriage 12. A block 39, slidable on the stationary rod 36, is secured to the end of the slide bar 34. A spring-controlled latch 45, pivotally supported on the bottom of member 38, is adapted normally to engage the block 39, and as long as this engagement takes place, the movement of the driving link 32, producing reciprocation of the slide bar 34, also causes reciprocation of the carriage 12.

Figure 6:
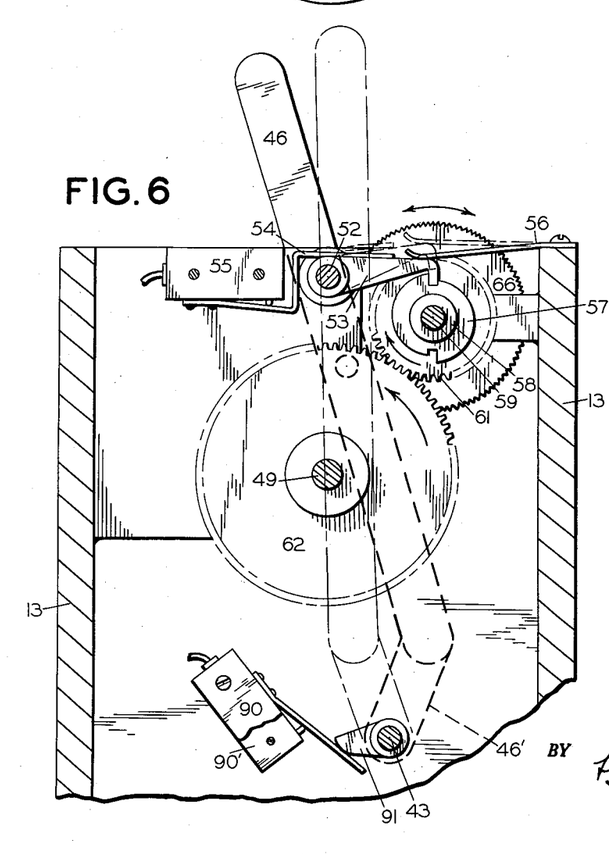
FIG. 6 is a fragmentary sectional elevation taken on line 6—6 of FIG. 3A, drawn to the same scale as FIG. 5.

A shaft 40 (FIG. 4A), carried on the main frame in suitable supports (not shown) below the carriage 12, carries a latch-engaging member 41. An arm 42, secured on a manually-operable control shaft 43, is connected through a link 44 with the latch-engaging member 41. Thus rotation of the shaft 43 (in counter-clockwise direction as viewed in FIG. 4A) will cause the latch-engaging member 41 to move the latch 45 into disengaging position. As long as the latch continues to be disengaged the carriage 12 will remain in the position shown in FIG. 4A while the link 32, slide bar 34 and block 39 maintain their reciprocating travel. An arm 46' (FIG. 6), secured on the shaft 43, is connected to a manual lever 46 pivotally supported at the rear of the main frame. An arm 91 (FIG. 6) also secured on the shaft 43 is so positioned as to operate a switch 90 when the shaft 43 is rotated by the manual lever 46. The switch 90 is connected with an electric clutch 60 (FIG. 3A) later explained. The arm 91 at the same time also operates another switch 90' (FIG. 6) the closing of which enables a circuit to the cutter knife solenoid 67 (FIG. 3A) to be closed by manually pressing a switch button 109 when it is desired to operate the cutter knife 27 to cut off an end of the film strip while the carriage 12 is not moving.

Figure 5:
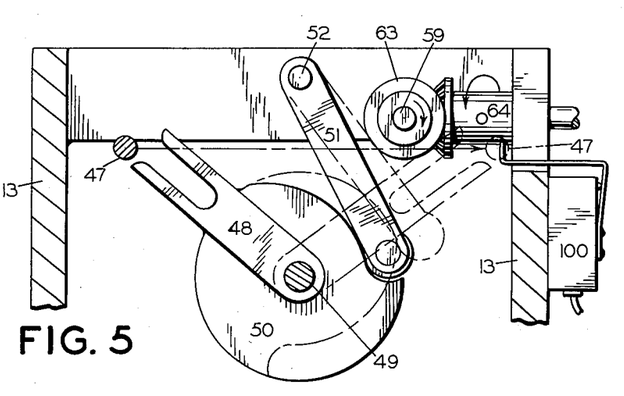
FIG. 5 is a fragmentary sectional elevation taken on the line 5—5 of FIG. 3A, drawn to a larger scale.

A lug 47 (FIGS. 3A and 5), projecting to one side from the rear of the carriage 12, is adapted to engage the bifurcated end of an operating arm 48. This arm 48 is secured to a cam disc 50 which in turn is attached to a one-way mechanical clutch 49' mounted on the shaft 49. The clutch 49' causes the shaft 49 to be rotated (counter-clockwise) with the counter-clockwise movement of the arm 48 and disc 50 but does not cause any rotation of the shaft 49 in the opposite direction. Thus the shaft 49 is rotated only while the carriage 12 moves back to the left to starting position. A gear 62 is secured on the shaft 49. The cam disc 50 also operates an arm 51 which is secured on a shaft 52 and is provided with a cam follower roller.

A combined switch-operating member and pawl 53 (FIGS. 3A and 6) is also secured on the shaft 52. Partial rotation of the shaft 52 therefore causes partial rotation of the member 53. A flat spring 56 bears down on the member 53 to maintain it in contact with the periphery of a slotted disc 57. This disc 57 has a pair of diametrically opposite slots in its periphery which slots are adapted to be engaged by the down turned lip on the end of the member 53 whenever the disc 57 is rotated 180°. The member 53 operates the switch arm 54 for the switch 55 and the switch 55 is so arranged that it will be closed only when the member 53 drops to its lowest position with its end lip dropped into one of the slots of the periphery of the disc 57. In other words it is necessary for the disc 57 to rotate 180° after the switch 55 has been closed before the switch can be closed again. This switch is in the circuit to the solenoid which operates the cutter blade 27, and will be referred to again later.

The disc 57 is secured on a sleeve 58 which is rotatably mounted on a shaft 59 (FIG. 3A) and the sleeve 58 is connected to the shaft 59 through the medium of an electric clutch 60. The clutch 60 is normally operatively connected and is rendered inoperative by actuation of the switch 90 (FIG. 6) previously mentioned. A gear 61, also secured on the sleeve 58, meshes with the gear 62 secured on the shaft 49. A bevel gear 63 on the end of shaft 59 meshes with a bevel gear 64 on the end of the shaft 65. The sprocket wheels 25 which operate to advance the film strip in the guideway 24 (FIG. 3A) as previously described, are carried on this shaft 65.

The arrangement just described is such that each time the arm 48 (FIG. 5) moves counter-clockwise, which is caused by the return of the carriage 12 to starting position, the one-way mechanical clutch 49' (FIG. 3A) will cause partial rotation of the gear 62 and therewith of the gear 61, the rotation of the latter being exactly 180°. When this occurs the sleeve 58, through the electric clutch 60, rotates the shaft 59, which in turn rotates the shaft 65 thus causing the film strip to be advanced in the guideway 24.

A hand wheel 66 is also secured on the shaft 59, and when the electric clutch 60 is inoperative, the hand wheel 66 can be used to turn the shafts 59 and 65 and the sprockets 25 and thus adjust the position of the film strip in the guideway 24. In this way the film strip is set in proper position at the start of the mounting operation and also, when desired, individual sections can be cut off separately from the film strip without having the entire machine in operation. The electric clutch is rendered inoperative, as previously explained, by halting the movement of the carriage 12 by the manual control lever 46.

The automatic actuation of the solenoid 67 for the cutter blade 27 is controlled by two switches, both of which must be closed in order to cause current to pass to the solenoid. One of these is a switch 76 (FIGS. 3A and 8) which is momentarily closed when its switch arm 75 is engaged by a lug 74 on the side of the carriage 12. This occurs when the carriage 12 is in the extreme left position. The other switch in the circuit to solenoid 67 is the switch 55 (FIG. 6), previously described, which switch is closed only when the disc 57, and therewith sleeve 58 and gear 61, have rotated 180° and the film strip F has been advanced a predetermined distance by the sprocket wheels 25. In other words, the cutter blade performs its cutting operation automatically only when the carriage 12 is in its extreme left or starting position and only when the film strip has been advanced the predetermined distance for placing the end transparency on the film strip in position over a mount on the right hand end of the carriage 12.

A pair of parallel mount folders 70 (FIGS. 3A, 4A and 4B) are secured to a shaft 71 rotatably mounted in suitable supports on the machine frame above the path of the right end of the carriage 12 (when the carriage 12 moves to the right). An operating arm 72 is secured on one end of the shaft 71 and a flat spring 73 (FIG. 3A) is carried by the other end of the shaft 71 and exerts a constant force to swing the mount folders 70 and arm 72 down in counter-clockwise direction. In normal lowered position the ends of the pair of mount folders 70 rest in recesses 70' in the tracks on the side walls 13'. The carriage 12 has a side lug 74 (FIG. 4B), previously mentioned, and when the carriage is in the left or starting position this lug 74 on the carriage is in engagement with the arm 72 and causes it and the mount folders to be raised. Then as the carriage 12 moves to the right the lug 74 moves to the right out of contact with the arm 72 and the arm and mount folders 70 drop down as the carriage 12 completes its travel to the right, and cause the frame 10B of the mount to be folded over on the frame 10A and the interposed transparency which has been severed from the end of the film strip. At the same time the frame 10B of the next mount on the carriage 12 begins to contact the upper sides of the ends of the lowered folders 70. When the frame 10B of the mount has been folded over on top of the frame 10A of the mount with the transparency in place between the frames, the mount is ready for heat sealing and is engaged by a second carriage 68 by which the mount is now moved further intermittently along the tracks continuing on the side walls 13'.

The second carriage 68 (FIGS. 3B and 4B) is mounted on the main frame of the machine in alignment with carriage 12 and similarly moves between the two side walls 13' which continue to provide tracks for the travelling mounts. A link 69 (FIG. 4B) connects this carriage 68 with the upper stub shaft on the double off-set crank 31 of the motor-driven disc 30. The second carriage 68 reciprocates simultaneously with the first carriage 12 in the same direction but travels approximately only half the distance of the carriage 12. The opposite ends of the two carriages come almost together when both carriages reach the end of their travel towards the right (as viewed in FIGS. 4A and 4B).

Figure 10:
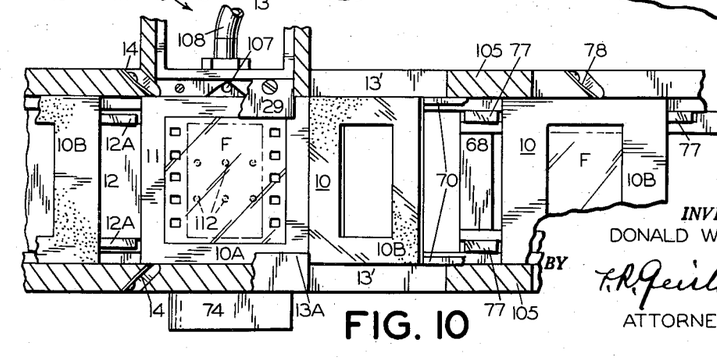
FIG. 10 is a fragmentary section on line 10—10 of FIG. 4A drawn to a larger scale.

The carriage 68 is provided with engaging elements 77 (FIG. 4B) for engaging the folded mount, as delivered along the tracks in the tops of the walls 13' by the first carriage 12, so as to cause the mount now to be moved along by the carriage 68 as this carriages moves to the right (as viewed in FIG. 4B). Side spring-engaging elements 78 (one of which is shown in FIGS. 3A and 10), are also provided on the walls 13' to hold the folded mount against being moved back to the left during the period of return travel of the carriage 68 from right to left.

The carriage 68 moves over a lower stationary heating block 79 (FIGS. 4B and 7) containing suitable electric heating elements, and also passes under an upper heating block 81 which forms part of a hingedly mounted upper heating assembly 80.

Figure 7:
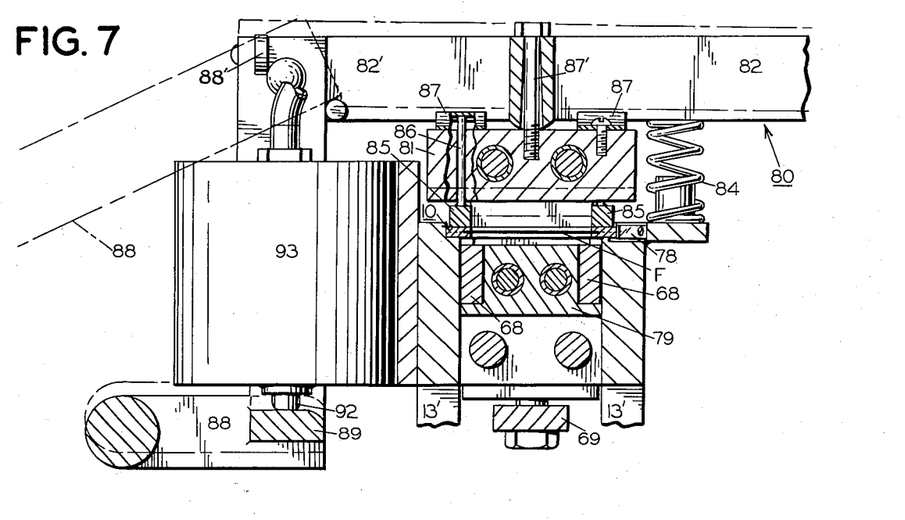
FIG. 7 is a fragmentary section on line 7—7 of FIG. 3B drawn to a larger scale.

Referring to FIGS. 3B and 7, the upper heating assembly 80 includes a frame 82 mounted on a hinge shaft 83 supported at the rear of the machine. A pair of members 82' of the frame 82 extend over and beyond the track 68 and upper heating block when the upper heating assembly 80 is in lowered operating position. In this position the frame 82 rests on a pair of compressible coil springs 84, one of which is shown clearly in FIG. 7.

A pair of spring-mounted runners 85 (FIGS. 4B and 7) are positioned below the upper heating block 81 and contact the side edges of the folded mount as the mount is carried along by the carriage 68 beneath the upper heating assembly. Each one of these runners is carried by the bottom ends of a pair of vertical bars 86 (one of which is shown in FIG. 7 and another of which is indicated in FIG. 3B), each pair of bars being secured to the respective ends of a flat spring 87 extending longitudinally on the top of the heating block 81, each of the flat springs 87 being secured along its center to the heating block. The heating block 81 in turn is supported from the frame 82 by a pair of bolts 87', and, as shown in FIG. 7, these bolts extend through openings in the frame 82, the diameters of which openings increase downwardly to allow for some flexibility in the positioning of the heating block 81 when the assembly 80 is swung down and placed in operating position.

A handle assembly 88 (FIGS. 3B and 7) is hinged to the outer ends of the two extending frame members 82' of the frame 82 of the upper heating assembly 80. This handle assembly includes a cross bar 89 which, when the handle assembly is swung down to the low or locking position shown in FIGS. 3B and 7, engages the bottom end of the piston rod 92 of an air piston carried in an air cylinder 93. The air cylinder 93 is connected at the top with a source of air under pressure (not shown) and the actuation of the air piston is controlled by a valve assembly (not shown), the operation of which is controlled automatically through electric switch means 93' (FIGS. 3B and 4B) actuated automatically by the driven rotating disc 30. A spring contact element of the switch means 93' bears against the periphery of the disc 30 and an indentation in the disc periphery causes the switch means to be actuated temporarily at a certain period during the rotation of the disc 30.

The arrangement is such that, when the carriage 68 is momentarily not moving (due to the position of the double reverse crank 31 on the rotating disc 30), the switch 93' will then be actuated to cause air under pressure to be delivered to the air cylinder 93. This results in the air piston and the piston rod 89 (FIG. 7) being forced downwardly which in turn presses the handle 89 of the upper heating assembly 80 downwardly and produces the desired heat-sealing pressure on the mounts beneath the heating block 81. The pressure is then automatically released to enable the mounts to continue their travel with the subsequent movement (to the right as viewed in FIG. 4B) of the carriage 68. A manually operable latch 88' holds the handle assembly 88 in swung down position.

A lower cooling block 94, provided with fins (not shown), or other suitable means allowing for air circulation, is mounted below the path of the carriage 68 beyond the lower heating block 69 and is separated from the latter by suitable insulation 94'. Also an upper cooling block 92 is carried by the frame 82 of the upper heating assembly, being spaced from the upper heating block 81. A spring-mounted runner 96, similar to the runners 85 previously mentioned, is carried by the upper cooling block 95. The purpose of the two cooling blocks, as apparent, is to allow cooling for the sealed mounts, while the mounts are still being held in flat position, before the mounts are discharged from the sealing section of the machine.

The sealed mounts are automatically stamped or numbered as they reach the cooling portion of the machine, but, since such stamping or numbering means in general is known to the art and does not constitute part of the present claimed invention, such means is not shown in the drawings and will not be here described.

The completed mounts are discharged onto an adjustable directing plate 97 (FIGS. 3B and 4B), and, depending upon the positioning of this plate 97, the completed mounts are caused to pass either into a forward receptacle 98 or onto a rearwardly travelling conveyor belt 99.

As the frame 10A of the mount is brought into registration with the guideway 24 for the film strip (FIGS. 3A, 8 and 10) it moves under lips 13A provided at that portion of tops of the side walls 13', which aid in holding the frame steady. Also, in order to maintain the superimposed transparency in place on the frame, the carriage 12 is provided with air suction ports 112 (FIGS. 4A, 8 and 10) which are connected through a manifold 113 to a vacuum line 117. The vacuum suction in the manifold 113 is controlled by a valve slide 114 which is slidable in a guideway 115. The valve slide 114 has a port 116 adapted to be brought into registration with an air inlet channel for the manifold 113 and when this occurs the passage of outside air into the manifold through the port 116 renders the air suction through the vacuum line entirely ineffective. When the carriage 12 reaches the end of its return travel (to the left) the slide 114 is engaged by the stationary member 35 which brings the slide into the position shown in FIG. 4A and thus with the port 116 out of registration with the air inlet channel of the manifold. As the carriage 12 reaches the end of its travel to the right the end of the slide 114 comes into contact with the adjacent end of the carriage 68. This moves the slide 114 so as to bring the port 116 into registration with the manifold inlet channel and consequently relieves the air suction hold on the transparency.

In the event an undesired transparency or end portion of the film strip has been severed by the cutter blade and its removal from the carriage is desired an air tube 108 (FIG. 8) leading from a source of air under pressure (not shown) is connected to a channel 107 leading to the side of the carriage. A charge of air through the channel 107 will act to disengage the loose transparency or piece of film from the side wall and guideway. The discharge of air from the compressed air source through the tube 108 is controlled by a suitable valve (not shown) operated from a push button switch 111 on the machine. Also in order to aid in removing the undesired portion of film or transparency and to lift it entirely from the carriage, the source of compressed air is further connected to the vacuum line 117 by a valve connection (not shown) which is operated from a push button switch 110 on the machine. By operating this switch the operator, at any time, not only can render the suction hold on the piece of film on the carriage ineffective but can also cause it to be blown off from the carriage.

In order to prevent inadvertent jamming of the machine, or operation of the machine when a mount is not in position to receive the transparency to be deposited, the automatic operation is controlled by two switches 100 and 101 either one of which must be closed. Switch 100 (FIGS. 3A and 5) is normally closed but is opened momentarily when the travel of carriage 12 (to the right) causes the lug 47 to engage the actuating element for switch 100. However, during the normal operation of the machine a mount on the right hand end of the carriage 12 will at the same time have reached a contact arm 102 causing it to be moved slightly counter-clockwise. The arm 102 is secured on a rotatable shaft 103 (FIG. 3A) carried in a pair of brackets 105. A switch arm 104 on the end of the shaft 103 engages the actuating element of the switch 101 and thus momentarily closes the switch 101 enabling the maching to continue operating until the moving of the lug 47 (to the left) from contact with the switch 100 enables switch 100 again to close and continue automatic operation of the machine. Thus, during the automatic operation of the machine, if a mount has failed to reach the end of the carriage 12 the machine will automatically be stopped and thus prevent unmounted transparencies from collecting on the carriage or prevent operation if a mount has become stuck along the carriage.

When the machine is started and there is no mount at the right end of the carriage 12, or when the machine is to be operated for only a single mount, the operator can prevent automatic stopping of the machine by manually pressing down on a finger lever 105' (FIG. 3A) secured to the shaft 103 and thus manually hold the switch 101 closed while the carriage 12 is in extreme right position.

A master control switch 106 (FIG. 3A) on the machine controls the circuit to the motor M (FIG. 4B) which operates the two carriages and therewith the other connected operating members. Other control switches for the heating elements, lights, etc., have been omitted from the drawings and description for clarity since these do not constitute part of the claimed novel features of the invention.

I claim:

1. In a machine for placing and securing film transparencies in mounts of the character described, a carriage mounted in a supporting frame assembly, means for reciprocating said carriage in a horizontal plane, guides for the mounts positioned along the sides of said carriage, mount-engaging elements on said carriage for moving a mount in one direction with said carriage, stationary mount-restraining means for holding the mount against movement in the opposite direction upon return movement of said carriage, a container for a stack of mounts arranged above said carriage with the bottom mount of the stack positioned for engagement by said mount-engaging elements, means in said container allowing one mount at a time to be removed from the stack by said carriage, a film guideway leading to the path of said carriage, and automatically operated means synchronized with said carriage reciprocating means for intermittently moving a film strip along said guideway a distance each time equal to the size of a single transparency in said strip, whereby a transparency will be automatically delivered from said guideway onto each mount on said carriage subsequent to the removal of such mount from said mount stack container.

2. In a machine for placing and securing film transparencies in mounts of the character described, a carriage mounted in a supporting frame assembly, means for reciprocating said carriage in a horizontal plane, guides on said frame assembly for the mounts along the sides of said carriage, mount-engaging elements on said carriage for moving a mount in one direction with said carriage, mount-restraining means on said frame assembly for holding the mount against movement in the opposite direction upon return movement of said carriage, a container for a stack of mounts arranged above said carriage with the bottom mount of the stack resting on said carriage, a mount-holding guide extending downwardly in said container through the mount stack but terminating a spaced distance above said carriage equal approximately to the thickness of a mount, whereby to allow one mount at a time to be moved from said stack by said carriage, a film guideway leading to the path of said carriage and substantially at 90° thereto, and automatically operating means operated by the movement of said carriage in one direction for intermittently moving a film strip along said guideway a distance each time equal to the size of a single transparency in said strip, whereby a transparency will be automatically delivered from said guideway onto each mount on said carriage subsequent to the removal of such mount from said mount stack container.

3. In a machine for placing and securing film transparencies in mounts of the character described, a carriage mounted in a supporting frame assembly, means for reciprocating said carriage in a horizontal plane, guides for the mounts positioned along the sides of said carriage, mount-engaging elements on said carriage for moving a mount in one direction with said carriage, stationary mount-restraining means for holding the mount against movement in the opposite direction upon return movement of said carriage, a container for a stack of mounts arranged above said carriage with the bottom mount of the stack resting on said carriage, a mount-holding guide extending downwardly in said container through the mount stack but terminating a spaced distance above said carriage equal approximately to the thickness of a mount, whereby to allow only one mount at a time to be moved from said stack by said carriage, a weight slidable on said holding guide adapted to rest on said stack of mounts, a film guideway leading to the path of said carriage, automatically operating means operated by the movement of said carriage in one direction for intermittently moving a film strip along said guideway a distance each time equal to the size of a single transparency in said strip, whereby a transparency will automatically be delivered from said guideway onto each mount on said carriage subsequent to the removal of such mount from said mount stack container, means for rendering said automatically operating means inactive, and manually operable means for moving said film strip in said guideway when said automatic means for moving said film strip is rendered inoperative.

4. In a machine for placing and securing film transparencies in mounts of the character described, a carriage mounted in a supporting frame assembly, means for reciprocating said carriage in a horizontal plane, guides for the mounts positioned along the sides of said carriage, mount-engaging elements on said carriage for moving a mount in one direction with said carriage, mount-restraining means for holding the mount against movement in the opposite direction upon return movement of said carriage, a container for a stack of mounts arranged above said carriage with the bottom mount of the stack positioned for engagement by said mount-engaging elements, means in said container allowing one mount at a time to be removed from the stack by said carriage, a film guideway leading to the path of said carriage, automatically operating means operated by the movement of said carriage in one direction for intermittently moving a film strip along said guideway a distance each time equal to the size of a single transparency in said strip, whereby a transparency will be automatically delivered from said guideway onto each mount on said carriage subsequent to the removal of said mount from said mount stack container, a cutter knife positioned at the discharging end of said film guideway adjacent said carriage, electrically-operated knife operating means for automatically severing the portion of the film strip extending from said guideway and over said carriage, and a switch control in said knife-operating means actuated by the movement of said carriage.

5. The combination set forth in claim 4 with the addition of a second switch control in said knife-operating means actuated by the automatic means for moving the film strip along said guideway, whereby to prevent automatic operation of said knife-operating means except upon predetermined movement of the film strip by said automatic film strip moving means.

6. The combination set forth in claim 4 with the addition of film engaging elements carried by the cutter knife and extending laterally therefrom for the purpose of holding down the end of the film during the severing of the film end by said cutter knife.

7. In a machine for placing and securing film transparencies in mounts of the character described, a carriage mounted in a supporting frame assembly, means for reciprocating said carriage in a horizontal plane, guides for the mounts along the sides of said carriage, mount-engaging elements on said carriage for moving a mount in one direction with said carriage, mount-restraining means for holding the mount against movement in the opposite direction upon return movement of the carriage, a container for a stack of mounts arranged above said carriage with the bottom mount of the stack resting on said carriage, means in said container allowing one mount at a time to be removed from the bottom of the stack by said carriage, a film guideway leading to the path of said carriage, automatically operating means synchronized with said carriage reciprocating means for intermittently moving a film strip along said guideway a distance each time equal to the size of a single transparency in said strip, whereby a transparency will automatically be delivered from said guideway onto each mount on said carriage subsequent to the removal of such mount from said mount stack container, a cutter knife positioned at the discharging end of said film guideway adjacent said carriage, automatic knife-operating means automatically severing a portion of the film strip extending from said guideway and over said carriage, air suction means carried by said carriage for the purpose of momentarily holding a transparency down on a mount on said carriage when the transparency has been delivered from said film guideway onto said carriage, a control for said air suction means operated by the movement of said carriage, and manually operated means for rendering said air suction means ineffective.

8. In a machine for placing and securing film transparencies in mounts of the character described, a first carriage mounted in a supporting frame assembly, means for reciprocating said carriage in a horizontal plane, guides for the mounts along the sides of said carriage, mount-engaging elements on said carriage for moving a mount in one direction with said carriage, mount-restraining means for holding the mount against movement in the opposite direction upon return movement of said carriage, a container for a stack of mounts arranged above said carriage with the bottom mount of the stack resting on said carriage, means in said container allowing one mount at a time to be moved from the bottom of the stack by said carriage, a film guideway leading to the path of said carriage, automatically operating means synchronized with said carriage reciprocating means for intermittently moving a film strip along said guideway a distance each time equal to the size of a single transparency in said strip, whereby a transparency will automatically be delivered from said guideway onto each mount on said carriage subsequent to the removal of such mount from said mount stack container, a cutter knife positioned at the discharging end of said film guideway adjacent said carriage, automatic knife-operating means for automatically severing the portion of the film strip extending from said guideway over said carriage, a second carriage reciprocating in said supporting frame assembly in alignment with the path of said first carriage, mount-engaging elements on the second carriage for moving mounts on said second carriage in the same direction as done by said first carriage, mount-restraining means for holding mounts on said second carriage against movement in the opposite direction, and means connected with said reciprocating means for said first carriage for reciprocating said second carriage.

9. In a machine for placing and securing film transparencies in mounts of the character described, a first carriage mounted in a supporting frame assembly, means for reciprocating said carriage in a horizontal plane, guides for the mounts along the sides of said carriage, mount-engaging elements on said carriage for moving a mount in one direction with said carriage, mount-restraining means for holding the mount against movement in the opposite direction upon return movement of said carriage, a container for a stack of mounts arranged above said carriage with the bottom mount of said stack resting on said carriage, means in said container allowing one mount at a time to be moved from the bottom of the stack by said carriage, a film guideway leading to the path of said carriage, automatically operating means synchronized with said carriage reciprocating means for intermittently moving a film strip along said guideway a distance each time equal to the size of a single transparency in said strip, whereby a transparency will automatically be delivered from said guideway onto each mount on said carriage subsequent to the removal of such mount from said mount stack container, a cutter knife positioned at the discharging end of said film guideway adjacent to said carriage, automatic knife-operating means for automatically severing the portion of the film strip extending from said guideway and over said carriage, a second carriage reciprocating in said supporting frame assembly in alignment with the path of the first carriage, mount-engaging elements on said second carriage for moving mounts on said second carriage in the same direction as done by said first carriage, mount-restraining means for holding mounts on said second carriage against movement in the opposite direction, means for reciprocating said second carriage, a mount folding assembly located in the path of said carriages, a pair of parallel arms in said mount folding assembly for engaging the side edges of an advancing mount, a spring normally holding said arms in lowered position, an operating arm connected with said parallel arms, and an engaging element on one of said carriages for momentarily engaging said operating arm and thereby raising said parallel arms of said mount folding assembly against the force of said spring.

10. In a machine for placing and securing film transparencies in mounts of the character described, a first carriage mounted in a supporting frame assembly, means for reciprocating said carriage in a horizontal plane, guides for the mounts along the sides of said carriage, mount-engaging elements on said carriage for moving a mount in one direction with said carriage, mount-restraining means for holding the mount against movement in the opposite direction upon return movement of said carriage, a film guideway leading to the path of said carriage, automatically operating means operated by the movement of the carriage in one direction for intermittently moving a film strip along said guideway a distance each time equal to the size of a single transparency in said strip, a cutter knife positioned at the discharging end of said film guideway adjacent said carriage, electrically operated knife-operating means for automatically severing the portion of the film strip extending from said guideway and over said carriage, a switch control in said knife-operating means actuated by the movement of said carriage, a second switch control in said knife-operating means actuated by the automatic means for moving the film strip along said guideway, whereby to prevent automatic operation of said knife-operating means except upon predetermined movement of the film strip by said automatic film strip moving means, a second carriage reciprocating in said supporting frame assembly in alignment with the path of said first carriage, mount-engaging elements on said second carriage for moving mounts on said second carriage in the same direction as done by said first carriage, mount-restraining means for holding mounts on said second carriage against movement in the opposite direction, means connected with said reciprocating means for said first carriage for reciprocating said second carriage, mount folding means located in the path of said first carriage, an operating arm connected to said mount folding means, and an engaging element on said first carriage for momentarily engaging said operating arm and operating said mounting folding means.

11. In a machine for placing and securing film transparencies in mounts of the character described, a first carriage mounted in a supporting frame assembly, means for reciprocating said carriage in a horizontal plane, guides for the mounts along the sides of said carriage, mount-engaging elements on said carriage for moving a mount in one direction with said carriage, mount-restraining means for holding the mount against movement in the opposite direction upon return movement of the carriage, a film guideway leading to the path of said carriage, automatically operating means synchronized with said carriage recpirocating means for intermittently moving the film strip along said guideway a distance each time equal to the size of a single transparency in said strip, whereby a transparency will be automatically delivered from said guideway onto said carriage, a cutter knife positioned at the discharging end of said film guideway adjacent said carriage, automatic knife-operating means for automatically severing the portion of the film strip extending from said guideway and over said carriage, a second carriage reciprocating in said supporting frame assembly in alignment with the path of said first carriage, mount-engaging elements on said second carriage for moving mounts on said second carriage in the same direction as done by said first carriage, mount-restraining means for holding mounts on said second carriage against movement in the opposite direction, means for reciprocating said second carriage, a mount folding assembly located in the path of said carriages, a heating element positioned below said second carriage, another heating element positioned above said second carriage, mount-pressing means associated with said upper heating element, and means for exerting a downward force on said mount-pressing means when said second carriage is not moving.

12. In a machine for placing and securing film transparencies in mounts of the character described, a first carriage mounted in a supporting frame assembly, means for reciprocating said carriage in a horizontal plane, guides for the mounts along the sides of said carriage, mount-engaging elements on said carriage for moving a mount in one direction with said carriage, mount-restraining means for holding the mount against movement in the opposite direction upon return movement of said carriage, a film guideway leading to the path of said carriage, automatically operating means synchronized with said carriage reciprocating means for intermittently moving a film strip along said guideway a distance each time equal to the size of a single transparency in said strip, whereby a transparency will be automatically delivered from said guideway onto said carriage, a cutter knife positioned at the discharging end of said film guideway adjacent said carriage, automatic knife-operating means for automatically severing the portion of the film strip extending from said guideway over said carriage, a second carriage reciprocating in said supporting frame assembly in alignment with the path of said first carriage, mount-engaging elements on said second carriage for moving mounts on said second carriage in the same direction as done by said first carriage, mount-restraining means for holding mounts on said second carriage against movement in the opposite direction, means for reciprocating said second carriage, a mount folding assembly located in the path of said carriages, a heating element positioned below said second carriage, a hinged frame mounted on said main frame assembly so as to be swung down over said second carriage, an upper heating element supported by said hinged frame, a pair of runners depending from said upper heating element and adapted to bear on the edges of mounts on said second carriage when said hinged frame is in lowered position, and means for momentarily pressing said hinged frame and therewith said runners downwardly when said second carriage is not moving.

13. In a machine for placing and securing film transparencies in mounts of the character described, a first carriage mounted in a supporting frame assembly, means for reciprocating said carriage in a horizontal plane, guides for the mounts along the sides of said carriage, mount-engaging elements on said carriage for moving a mount in one direction with said carriage, mount-restraining means for holding the mount against movement in the opposite direction upon return movement of said carriage, a film guideway leading to the path of said carriage, automatically operating means synchronized with said carriage reciprocating means for intermittently moving the film strip along said guideway a distance each time equal to the size of a single transparency in said strip, a cutter knife positioned at the discharging end of said film guideway adjacent said carriage, automatic knife-operating means for automatically severing the portion of the film strip extending from said guideway and over said carriage, a second carriage reciprocating in said supporting frame assembly in alignment with the path of said first carriage, mount-engaging elements on said second carriage for moving mounts on said second carriage in the same direction as done by said first carriage, mount-restraining means for holding mounts on said second carriage against movement in the opposite direction, means for reciprocating said second carriage, a mount folding assembly located in the path of said carriages, a stationary heating element positioned below said second carriage, a hinged frame mounted on said main frame assembly so as to be swung down over said second carriage, an upper heating element supported by said hinged frame, a pair of runners depending from said upper heating element and adapted to bear on the edges of the mounts on said second carriage when said hinged frame is in lowered position, an air cylinder and piston operating momentarily to press said hinged frame and therewith said runners downwardly when said second carriage is not moving, and control means actuated by the means for reciprocating said second carriage for actuating said air cylinder and piston.

14. The combination set forth in claim 12 with the addition of a cooling block on said hinged frame arranged for positioning above said second carriage beyond said upper heating element when said hinged frame is in lowered position.

References Cited in the file of this patent
UNITED STATES PATENTS
2,889,066    Alberty _______________ June 2, 1959